United States Patent
Weiss

(10) Patent No.: US 8,958,820 B2
(45) Date of Patent: Feb. 17, 2015

(54) SYSTEM AND METHOD FOR AGGREGATING AND ASSOCIATING MOBILE DEVICE LOCATION DATA

(71) Applicant: Andrew Weiss, San Ramon, CA (US)

(72) Inventor: Andrew Weiss, San Ramon, CA (US)

(73) Assignee: WaveMarket, Inc., Emeryville, CA (US)

( * ) Notice: Subject to any disclaimer, the term of this patent is extended or adjusted under 35 U.S.C. 154(b) by 54 days.

(21) Appl. No.: 13/957,900

(22) Filed: Aug. 2, 2013

(65) Prior Publication Data

US 2013/0316734 A1 Nov. 28, 2013

Related U.S. Application Data

(62) Division of application No. 12/917,286, filed on Nov. 1, 2010, now Pat. No. 8,504,062.

(51) Int. Cl.
*H04W 24/00* (2009.01)
*H04W 4/02* (2009.01)
*G06Q 30/02* (2012.01)
*H04W 64/00* (2009.01)

(52) U.S. Cl.
CPC ........... *H04W 4/025* (2013.01); *G06Q 30/0261* (2013.01); *H04W 4/021* (2013.01); *H04W 64/00* (2013.01)
USPC ....................... 455/456.1; 455/456.5; 455/418

(58) Field of Classification Search
CPC ........ H04W 64/00; H04W 4/02; H04W 8/245
USPC ..................................... 455/456.1, 456.5, 418
See application file for complete search history.

(56) References Cited

U.S. PATENT DOCUMENTS

| | | | |
|---|---|---|---|
| 6,957,074 B2 | 10/2005 | Wang et al. | |
| 7,822,426 B1 * | 10/2010 | Wuersch | 455/456.1 |
| 8,359,006 B1 * | 1/2013 | Zang et al. | 455/410 |
| 2003/0060213 A1 | 3/2003 | Heinonen et al. | |
| 2005/0085257 A1 | 4/2005 | Laird et al. | |
| 2006/0293025 A1 * | 12/2006 | Chiou et al. | 455/405 |
| 2007/0010248 A1 | 1/2007 | Dravida et al. | |
| 2007/0030824 A1 | 2/2007 | Ribaudo et al. | |
| 2010/0074133 A1 * | 3/2010 | Kim et al. | 370/252 |
| 2010/0080179 A1 * | 4/2010 | Santhanam | 370/329 |
| 2010/0093376 A1 | 4/2010 | Del Castillo et al. | |
| 2010/0150149 A1 * | 6/2010 | Morrison et al. | 370/389 |

(Continued)

OTHER PUBLICATIONS

U.S. Appl. No. 12/917,286, filed Nov. 1, 2010, Weiss.

*Primary Examiner* — Danh Le
(74) *Attorney, Agent, or Firm* — Dovas Law, P.C.

(57) ABSTRACT

A computer-implemented method for processing mobile device location data is provided. Location data is filtered based on age and accuracy or precision of location coordinates. Location data is partitioned based on the location coordinates into a plurality of clusters including a plurality of location data instances. The plurality of clusters are filtered based on a number of data instances in a particular cluster and a period of time over which data instances of the particular data cluster are generated. A distance is determined from a location coordinate corresponding to the data instances of one or more of the plurality of clusters to a particular predetermined location, and the one or more of the plurality of clusters are correlated with the particular predetermined location in response to the distance being less than a predetermined distance. The invention further provides a location data processing system.

7 Claims, 6 Drawing Sheets

(56) References Cited

U.S. PATENT DOCUMENTS

2010/0232354 A1* 9/2010 Patil et al. .................... 370/328
2011/0087431 A1 4/2011 Gupta et al.
2011/0235623 A1* 9/2011 Alizadeh-Shabdiz et al. ............................ 370/338

* cited by examiner

SYSTEM AND METHOD FOR AGGREGATING AND ASSOCIATING MOBILE DEVICE LOCATION DATA

CROSS REFERENCE TO RELATED APPLICATIONS CROSS REFERENCE TO RELATED APPLICATION(S)

This application is a division of U.S. non-provisional application Ser. No. 12/917,286, filed Nov. 1, 2010, which is incorporated by reference as if fully set forth.

BACKGROUND

Many mobile devices such as cellular telephones, smart phones and the like have the ability to perform network scans to determine radio signal information, such as identifiers associated with nearby cellular base transceiver stations, WiFi™ access points and Bluetooth™ access points. Mobile devices may be further enabled to perform signal strength estimates and other signal measurements. Base transceiver stations and radio access points are primarily used for voice and data service access to the mobile device, but due to their relative permanence can be exploited for other purposes, including determining device location. Mobile devices are frequently further enabled to receive signals from Global Positioning System (GPS) satellites for estimating mobile device location coordinates.

A number of approaches exist to translate terrestrial signal information into location, including cell triangulation and trilateration techniques, such as Time Difference of Arrival ("TDOA"), Enhanced Observed Time Difference ("EOTD"), Advanced Forward Link Trilateration ("AFLT") and Enhanced Cell Identification ("E-CID"). Such methods are considered terrestrial counterparts to the GPS satellite-based system which uses a form of triangulation based on satellite positioning. A mobile device may be configured for determining its own location, or in some cases, a remote system in communication with a mobile device can be configured to determine a mobile device's location using translation methods such as those described above.

A mobile device's location history may be valuable for research or marketing purposes. Mobile device location data is usually generated in the form of an estimated geographic coordinate and a time stamp corresponding to when the geographic coordinate was recorded. Data in such basic form may be insufficient for research or marketing purposes, or for providing services to a mobile device user.

It would be desirable to collect mobile device location data and organize the data into useful form for association with content such as advertising and promotional material related to location. It would further be desirable to organize mobile device location data for the purpose of making predictions and facilitating conclusions regarding a mobile device user's travel behaviors.

SUMMARY

The invention provides a computer-implemented method for processing mobile device location data. The method includes collecting location data associated with a mobile device, the location data including location coordinates and time stamps respectively associated with the location coordinates. Location data is filtered based on age and accuracy or precision of the location coordinates. The location data is partitioned based on the location coordinates into a plurality of clusters including a plurality of location data instances. The plurality of clusters are filtered based on a number of data instances in a particular cluster and a period of time over which data instances of the particular data cluster are generated as indicated by respective time stamps of the data instances. A distance is determined from a location coordinate corresponding to the data instances of one or more of the plurality of clusters to a particular predetermined location, and the one or more of the plurality of clusters are correlated with the particular predetermined location in response to the distance being less than a predetermined distance.

The invention further provides a computer-implemented method including partitioning a collection of tuples including time stamps and location coordinates generated via a particular mobile device associated with a user. The tuples are partitioned into a plurality of clusters wherein the distances between location coordinates of the tuples in each of the plurality of clusters are less than a predetermined distance. Size-based clusters are derived from the plurality of clusters, wherein the number of tuples in each size-based cluster is greater than a predetermined number. Time-based clusters are derived from the plurality of clusters, wherein a time period from a substantially earliest tuple to a substantially latest tuple in each of the time-based clusters, as indicated by respective time stamps, is greater than a predetermined length of time. One or more base location clusters are designated wherein at least a predetermined percentage of the tuples correspond to one or more particular time windows.

The invention further provides a location data processing system including at least one computing device including at least one memory comprising instructions operable to enable the computing device to perform a procedure. The procedure includes collecting location data associated with a mobile device, the location data including location coordinates and time stamps respectively associated with the location coordinates. Location data is filtered based on age and accuracy or precision of the location coordinates. The location data is partitioned based on the location coordinates into a plurality of clusters including a plurality of location data instances. The plurality of clusters are filtered based on a number of data instances in a particular cluster and a period of time over which data instances of the particular data cluster are generated as indicated by respective time stamps of the data instances. A distance is determined from a location coordinate corresponding to the data instances of one or more of the plurality of clusters to a particular predetermined location, and the one or more of the plurality of clusters are correlated with the particular predetermined location in response to the distance being less than a predetermined distance.

The invention further provides non-transitory computer-readable media tangibly embodying a program of instructions executable by a computing device to implement a method, the computing device being capable of interfacing with a communications network. The method includes collecting location data associated with a mobile device, the location data including location coordinates and time stamps respectively associated with the location coordinates. Location data is filtered based on age and accuracy or precision of the location coordinates. The location data is partitioned based on the location coordinates into a plurality of clusters including a plurality of location data instances. The plurality of clusters are filtered based on a number of data instances in a particular cluster and a period of time over which data instances of the particular data cluster are generated as indicated by respective time stamps of the data instances. A distance is determined from a location coordinate corresponding to the data instances of one or more of the plurality of clusters to a particular predetermined location, and the one or more of the plurality of clusters are correlated with the particular predetermined location in response to the distance being less than a predetermined distance.

The invention further provides a computer-implemented method including correlating each of a plurality of predetermined locations with one or more categories and determining for one or more data instances of a mobile device the distance from a location coordinate corresponding to the one or more data instances to each of the plurality of predetermined locations. A user of the mobile device is correlated with the one or more categories of those of the plurality of predetermined locations for which the distance from the location coordinate is less than a predetermined distance. A frequency value is assigned to each of the one or more categories correlated with the user based on the number of those of the plurality of predetermined locations correlated with the one or more categories for which the distance from the location coordinate is less than the predetermined distance. Location-related data, for example an advertisement, is correlated with one or more of the plurality of predetermined locations. For the one or more of the plurality of predetermined locations, a popularity value is assigned to each of the one or more categories based on the number of the plurality of predetermined locations correlated with each of the one or more categories. A current position of the mobile device is determined.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
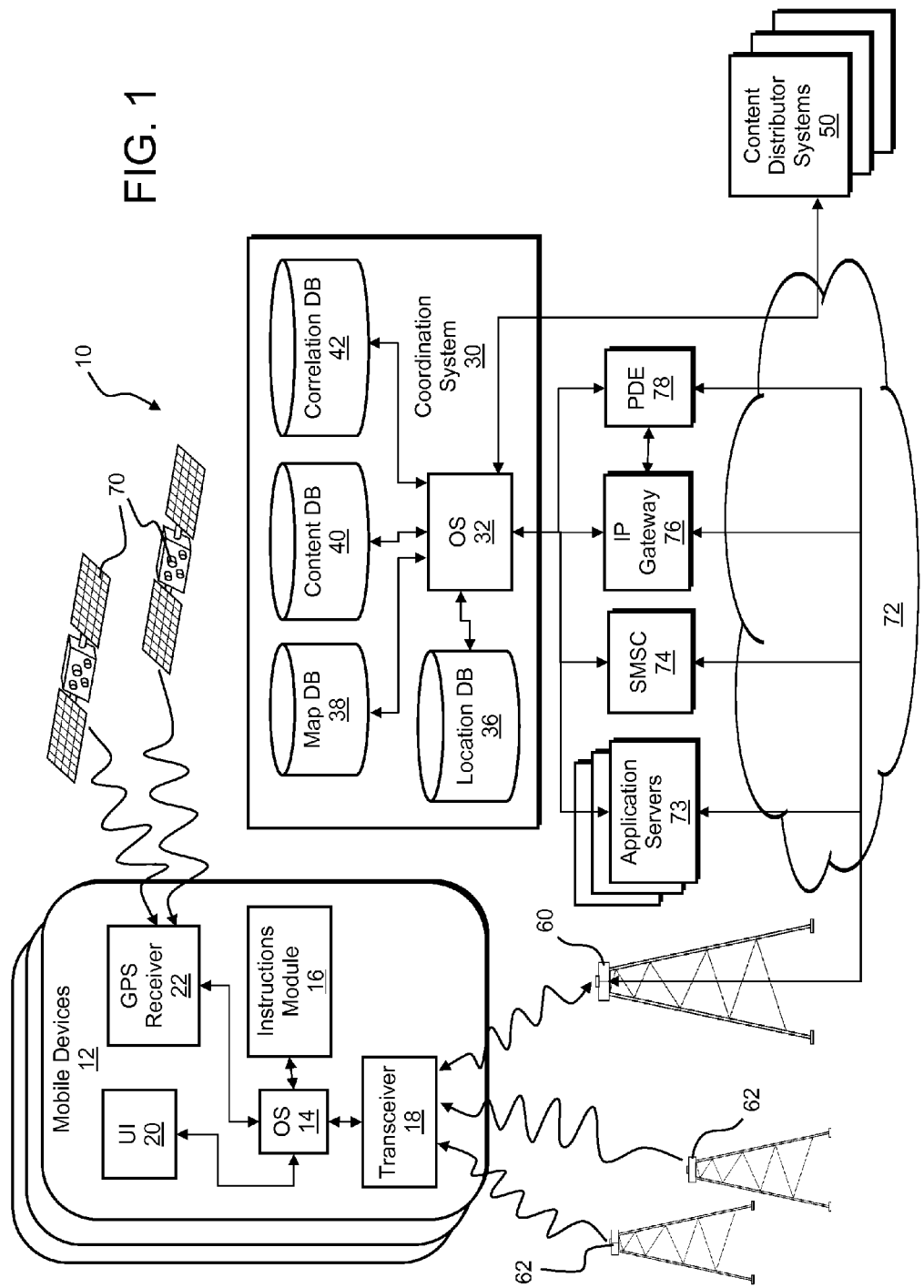
FIG. 1 is a schematic illustration of an exemplary operating environment in which a coordination system is operable according to a preferred embodiment of the invention.

The preferred embodiments of the invention are described below with reference to the drawing figures where like numerals represent like elements throughout.

Referring to FIG. 1, a schematic illustration is shown of an exemplary operating environment 10 in which preferred mobile device communication systems, in the form of mobile devices 12 and a coordination system 30, can be used. The mobile devices 12 and coordination system 30 each include one or more computing devices and one or more memory devices, which computing devices and memory devices can be integrally constructed or connected in any suitable manner, for example via a network. It is to be understood that a system or server comprises a computer system, as known in the art.

Each mobile device 12 preferably provides a platform according to a preferred embodiment of the invention which enables an operating system 14 and a module of instructions 16 preferably residing in a memory of the mobile device 12. The mobile device 12, which preferably includes cellular telephone functionality, includes a transceiver 18 for communication with cellular base transceiver stations 60, 62 ("base stations") and a user interface 20, preferably including a display and one or more audio speakers. A GPS receiver 22 is preferably provided for receiving signals from GPS satellites 70. The transceiver 18 can be further configured to communicate with other wireless stations or devices, and the mobile device 12 can alternatively support a plurality of transceivers for communication with a plurality of wireless stations or devices of differing protocols.

The coordination system 30 provides a platform according to a preferred embodiment of the invention which enables an operating system 32 and memory or memories which permit operation of databases 36, 38, 40, 42. Preferably, collected mobile device location data is stored in a location database 36, map data corresponding to roads, addresses and other definable geographic data are stored in a map database 38, and content for distribution to a mobile device user via a mobile device is stored in a content database 40. The coordination system 30 is preferably configured to collect data indicative of mobile device location from the mobile devices 12 via a telecommunication network 72 and to associate the mobile devices 12 with particular users. The location data is preferably received in the form of tuples. Each tuple preferably includes one or more location coordinates and one or more time stamps respectively associated with the one or more location coordinates. Each tuple also preferably includes an identification ("ID") relating the tuple to a particular mobile device and a precision indication indicating the precision of the location coordinate.

The tuples or other suitable mobile device location data are preferably received by the coordination system 30 in the form of one or more short message service ("SMS") messages received from the mobile devices 12 via a short message service center ("SMSC") 74, which may be integrated with the telecommunication network 72. Alternatively, location data can be sent by the mobile devices 12 using internet protocol ("TCP/IP") and received by the coordination system 30 via an internet protocol ("IP") gateway 76, which may be integrated with the telecommunication network 72. The coordination system 30 can alternatively query a remote position determining entity ("PDE") 78, a Gateway Mobile Location Center ("GMLC"), or other system for disseminating location data associated with mobile devices, which PDE 78, GMLC or other system may be provided as a service by a telecommunication carrier or other party, and which systems may deliver data to the coordination system 30 via internet protocol through the IP gateway 76 or via other suitable protocol. One or more external application servers 73 execute applications which use location data provided by the mobile devices 12 or the coordination system 30 to provide content or services to a user of a particular mobile device.

Content distributor systems 50 transmit to the coordination system 30 content for distribution to the mobile devices 12 in the form of location-related data, which data is stored in the content database 40. Location-related data is preferably associated with addresses, building structures, geographic coordinates or geographic areas. Content distributor systems 50 are preferably associated with advertisers who provide the location-related data as advertisements, business or event names or descriptions, or other promotion material tied to one or more addresses, building structures, geographic coordinates or geographic areas.

Figure 2:
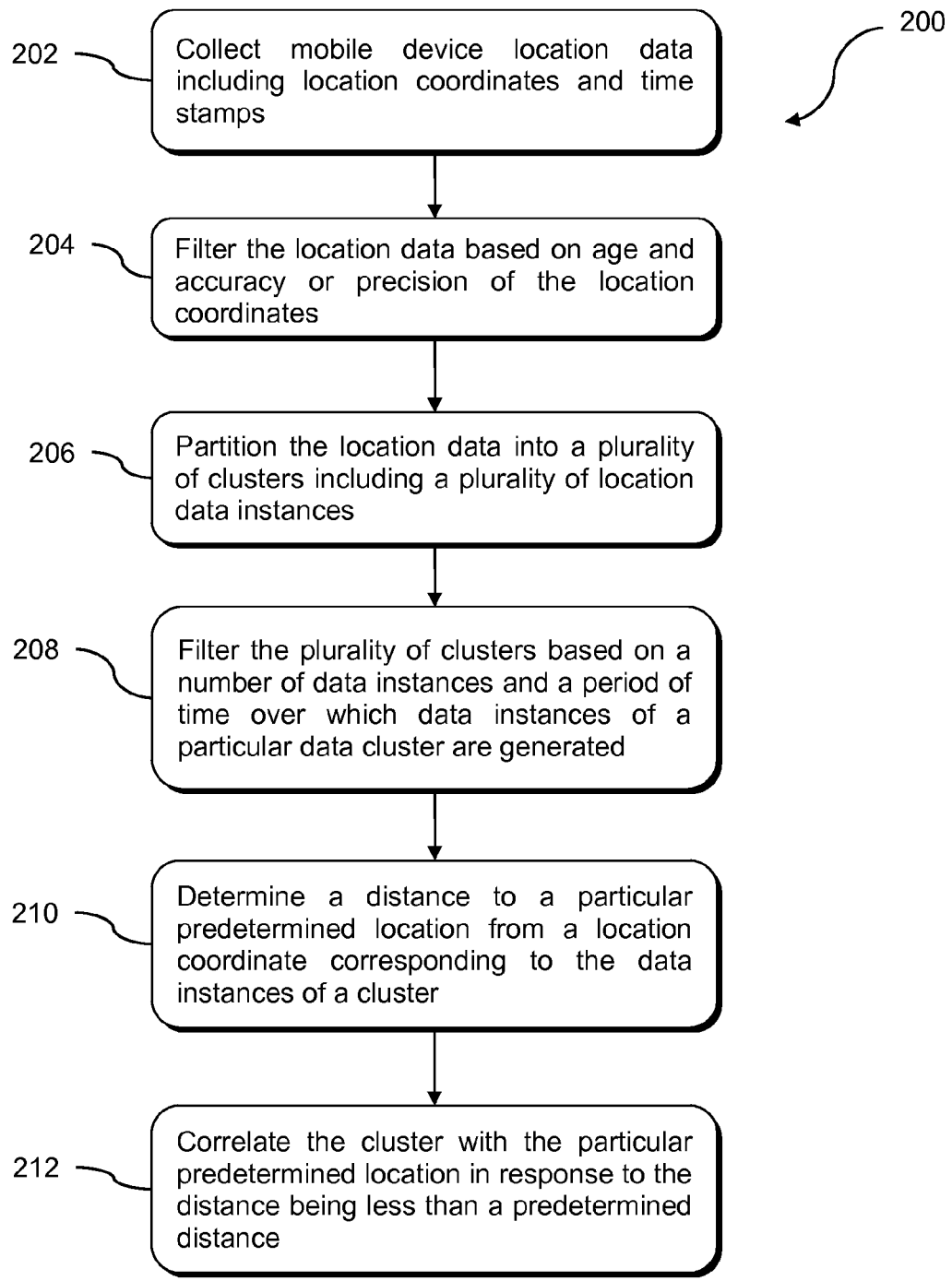
FIG. 2 is a flow chart showing a computer-implemented method for processing mobile device location data according to a preferred embodiment of the invention.

Referring to FIG. 2, a method 200 for processing mobile device location data is shown. The method 200 is described with reference to the components shown in the operating environment 10 of FIG. 1, wherein the coordination system 30 preferably includes memory suitable for storing instructions for performance of the method 200. The method 200 may alternatively be performed via other suitable systems. The method 200 includes collecting location data associated with a mobile device 12, which location data includes location coordinates and time stamps respectively associated with the location coordinates (step 202). Location data is filtered based on age and accuracy or precision of the location coordinates (step 204). The location data is partitioned based on the location coordinates into a plurality of clusters including a plurality of location data instances (step 206). The plurality of clusters are filtered based on a number of data instances in a particular cluster and a period of time over which data instances of the particular data cluster are generated as indicated by respective time stamps of the data instances (step 208). A distance is determined to a particular predetermined location from a location coordinate corresponding to the data instances of a first one or more of the plurality of clusters (step 210), and the first one or more of the plurality of clusters is correlated with the particular predetermined location in response to the distance being less than a predetermined distance (step 212). The particular predetermined location is preferably correlated with a retail store, restaurant, event location, place of commerce or any travelable venue. A distance to a plurality of predetermined locations can be determined from a particular cluster, wherein a one cluster can be correlated with a plurality of predetermined locations. The steps of the method 200 are preferably performed by the coordination system 30 or other suitable system or systems, wherein mobile device location data is received via the network 72. Location data is preferably collected as tuples associated with a particular mobile device corresponding to a particular user, wherein each tuple is a data instance preferably including at least a location coordinate, a time stamp, a precision indication and an identifier for the mobile device.

In the process of partitioning the clusters, the distance is preferably determined between location coordinates of the filtered location data. Clusters are preferably partitioned wherein the location coordinates of any two data instances of the particular cluster are separated by less than a predetermined maximum distance. The predetermined maximum distance is preferably dependent on the geography and demographics of the particular location, wherein more densely populated areas correspond to a lesser predetermined maximum distance and corresponding clusters covering a smaller geographic area. A clusterization algorithm, such as a K-Means variant, is preferably employed to partition the collection of tuples, with the condition that for each subset, the distance between any 2 tuples, as defined by the euclidean metric distance between the latitude, longitude of these tuples, is less than some maximal distance, for example 150 meters. The centroid of each cluster, as derived by the average of the latitude, longitude of the tuples in the cluster, is preferably derived.

For a particular cluster to be correlated with a particular predetermined location, it can be further required that a time stamp of one or more location data instances of the particular cluster corresponds to a predetermined time range. For example, a particular predetermined location may correspond to a retail outlet or other place of business open for business only during the hours of 9:00 am to 8:00 pm daily, in which case the predetermined time range can be set to 9:00 am to 8:00 pm daily, wherein a particular cluster is correlated with the location only if at least one of, or at least a predetermined number of, its data instances correspond to a time between 9:00 am to 8:00 pm.

The coordination system 30 is preferably configured to receive location-related data such as advertisements, business or event names or descriptions, or other promotion material from an advertiser or other entity via an external system, for example a content distribution system 50 through the network 72. The determined particular predetermined location is correlated with the location-related data, and the location-related data is preferably transmitted to the mobile device 12 or a user thereof in response to correlating a particular one of the plurality of clusters corresponding to the particular mobile device 12 with the particular predetermined location. In such manner, a particular mobile device user is provided with relevant location-related data corresponding to a determined location of the particular mobile device user.

Filtering the location data preferably includes eliminating from consideration location data instances older than a predetermined length of time as indicated by respective time stamps of the location data. In such manner, data which may be irrelevant due to age is not partitioned into a cluster. Filtering the location data also preferably includes eliminating from consideration location data instances including location coordinates corresponding to one or more measurements having accuracy or precision measured outside a predetermined range. Collected tuples preferably include a precision indication coupled with a location coordinate, wherein if the location coordinate is too imprecise, the tuple is eliminated and is not used as a data instance eligible to be partitioned into a cluster. A received precision indication can include a distance measurement, for example 100 meters, wherein a particular tuple's location coordinate may differ from a mobile device's actual position by as much as 100 meters in any direction. The coordination system 30 can be configured for example to eliminate from consideration tuples including a precision indication of greater than 200 meters.

The coordination system 30 is further preferably configured to define one or more inhabitable areas including boundaries based on maps stored in the map database 38. Inhabitable areas can include for example areas known to be traveled by persons on foot or in vehicles. Filtering the location data preferably includes eliminating from consideration location data instances corresponding to geographic coordinates outside such defined inhabitable areas. Alternatively, uninhabitable areas are defined, such as mountainous areas or waterways not generally navigated, and location data instances corresponding to geographic coordinates within the uninhabitable areas are eliminated from consideration.

A centroid is preferably determined from an average of two or more of the location coordinates of the data instances of each of the plurality of clusters. In determining the centroid, data instances can be weighted based on age or precision indication, wherein more recent or more precise location data is weighted more than less recent and less precise location data. In determining the distance to a particular predetermined location from a location coordinate corresponding to the data instances of one of the plurality of clusters (step 210), the distance from the centroid to the predetermined particular location is preferably determined.

A particular cluster associated with a user can be correlated with one or more particular predetermined locations. In the case where the limiting predetermined distance governing the inclusion of predetermined locations is large, more predetermined locations may correspond to a particular cluster than if the predetermined distance is short. The predetermined distance preferably defines a radius extending from the centroid of a particular cluster which defines a geospatial circle with the centroid at its center. The limiting predetermined distance can be small, for example 200 feet or large, for example 2 or more miles.

The method 200 further preferably includes defining one or more base locations based on the time stamps of a predetermined number of data instances in a second one or more of the plurality of clusters, which data instances in the second one or more of the plurality of clusters correspond to a predetermined time range for a predetermined number of days. The terms first and second are used herein only to establish a naming convention for the clusters and do not connote the timing of generation of the respective clusters or the timing of steps in the method 200. The second one of the plurality of clusters or data instances therein may be generated prior to the first one of the plurality of clusters or data instances therein, or vice versa.

A base location is for example a mobile device user's home or place of work, wherein the user maintains a predictable presence over a predetermined time range during particular days of the week. The predetermined time range can be set as any suitable range which can be non-day-specific, for example between 9:00 pm and 8:00 am on any day, or which can be day-specific, for example between 9:00 am and 5:00 pm on Monday through Friday and at no time on Saturday and Sunday. The predetermined number of days can correspond to an absolute number of days, such as ten days, an absolute number of days within a month, such as 10 days out of a 30 day period, a number of weekdays in a week, such as 4 days out of Monday through Friday, or a number of weekdays in more than one week, such as 3 days out of Monday through Friday for 4 consecutive weeks. Alternatively, a base location can be defined by establishing a mobile device's presence at a particular location based on data instances of a particular cluster corresponding to a particular time range on particular days of the week for a predetermined number of days or weeks, wherein the particular time range is not a predetermined time range, and/or the particular days are not predetermined days of the week. For example, if it is determined by data instances of a particular cluster that a mobile device 12 is approximately positioned at a particular location during the particular time range of about 3:00 pm through 11:00 pm, on the particular days Tuesday through Saturday, for the predetermined period of time of 3 or more weeks, the base location is defined as the particular location. Alternatively, other suitable processes, preferably implementing learning algorithms, can be used to detect patterns of movement of a particular mobile device 12 for establishing suitable base locations where a mobile device user is consistently located.

The base location is preferably correlated with location-related data. Location-related data can include advertisements for products or services available near to the base location, identifications or descriptions of businesses or events near to the base location, or other promotion material, from an advertiser or other entity, related to the particular base location. Location-related data is preferably transmitted to the mobile device 12, or transmitted to the mobile device user by other means, in response to correlating a particular one of the plurality of clusters with the base location. The base location is alternatively correlated with demographic data such as base location property value and estimated income or education level of a population residing in an area including the base location or within an area defined by a zip code associated with the base location. Advertisements are preferably transmitted to the user of the mobile device 12 based on the demographic data. Such advertisements may be transmitted to the mobile device directly or may be otherwise accessed by a user of the mobile device via a client system other than the mobile device 12. Such advertisements can be location-related data, wherein in response to a mobile device user's travels, when a particular cluster is correlated with a particular predetermined location, the location-related data corresponding to the particular predetermined location and corresponding to the demographic data associated with the mobile device user's base location is transmitted or otherwise rendered accessible to the user via the mobile device 12 or other client system. As indicated herein advertisements can include any suitable promotional material.

In filtering the plurality of clusters (step 208) to be correlated with a particular predetermined location or a base location, each cluster in which a number of data instances is less than a predetermined minimum number and in which a period of time over which the data instances of the cluster are generated is less than a predetermined period of time, as indicated by respective time stamps of the data instances, is preferably eliminated from consideration. Alternatively, each cluster in which a number of data instances is less than a predetermined minimum number or in which a period of time over which the data instances are generated is less than a predetermined period of time is eliminated from consideration. Relatively few data instances in a particular cluster or a relatively short period of time over which data instances in a particular cluster are generated may indicate that a user of a tracked mobile device spent an insignificant period of time at or near a particular location associated with the particular cluster, or that the user was simply passing through a particular location associated with the cluster. Accordingly, it would be beneficial to eliminate such clusters from consideration prior to correlating clusters with particular predetermined locations or base locations.

Clusters corresponding to determined base locations are preferably eliminated from consideration in determining distances from respective location coordinates of the plurality of clusters to respective predetermined locations and in correlating ones of the plurality of clusters with the respective predetermined locations in response to respective distances being less than respective predetermined distances. Further, data instances included in a data cluster corresponding to a base location are preferably excluded from being partitioned and used in the creation of new data clusters.

The coordination system 30 is configured to configure and store cluster correlation data indicative of the correlation of a plurality of clusters with base locations and predetermined locations and generated pursuant to the above-described method. The cluster correlation data can be stored in a cluster correlation database 42 and can be transmitted to remote application servers 73 pursuant to appropriate user authorization. The application servers 73 may enable applications such as social networking applications which use the cluster correlation data to provide content or services to a user based on the user's current location and location history.

Figure 3:
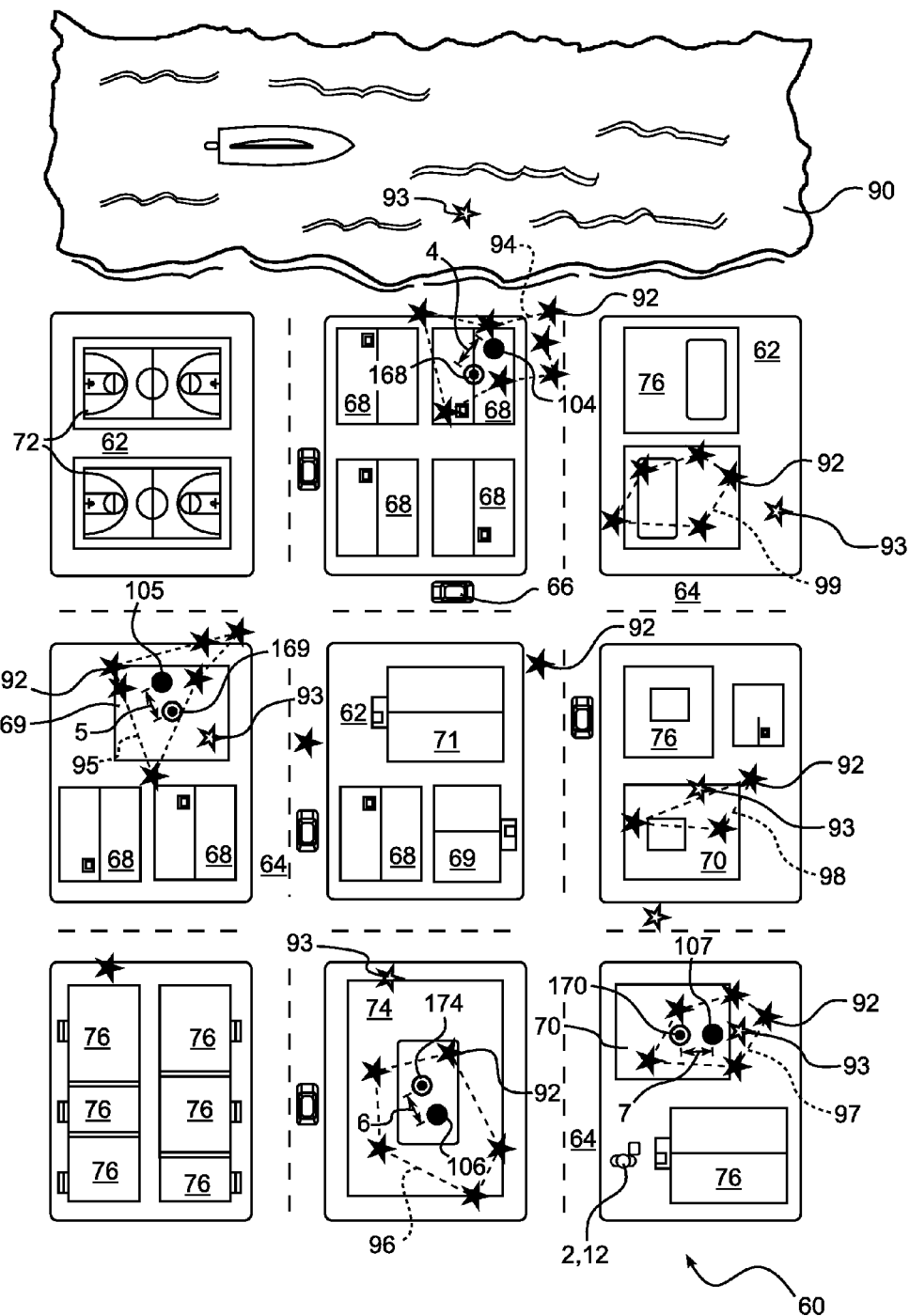
FIGS. 3 and 4 are plan views of an example city streetscape for illustrating methods according to a preferred embodiment of the invention.

Referring to FIG. 3, a plan view is shown of an example city streetscape 60 in which the coordination system 12 performs an example implementation of a method according to a preferred embodiment of the invention. The streetscape 60 includes city blocks 62 separated by streets 64 permitting travel of vehicles 66, and a body of water 90. Various building structures are provided on the city blocks 62 including predetermined locations corresponding to homes 68, commercial offices 69, retail stores 70, a theater 71, playgrounds 72, a department store 74, and restaurants 76. A user 2, carrying a mobile device 12, walks or drives a vehicle within the streetscape 60.

Location data instances associated with the mobile device 12, including time stamps and location coordinates figuratively represented in FIG. 3 by stars, are generated by the mobile device 12 carried by and associated with the user 2, or alternatively, are generated by a telecommunication carrier system in communication with the mobile device 12. Location data instances 93, represented by outlined stars, include time stamps indicating an age of the location data greater than a predetermined acceptable length of time, include precision stamps indicating a location precision outside an accepted predetermined range, or include a location coordinate outside a known inhabitable area, such as within the body of water 90, which location data instances 93 are therefore filtered out from further processing. Location data instances 92, represented by solid stars, include time stamps which are not older than the particular acceptable predetermined length of time, include precision stamps corresponding to the acceptable predetermined range, and include location coordinates inside known inhabitable areas.

The unfiltered location data instances 92 are partitioned into clusters 94, 95, 96, 97, 98, 99 represented by dashed lines connecting the location data instances 92 in each cluster. The clusters 94, 95, 96, 97, 98, 99 are generated such that the location coordinates of any two location data instances 92 of the particular cluster are separated by less than a predetermined maximum distance, for example 50 meters.

Cluster 98 is filtered out from further processing because its number of unfiltered location data instances 92 fail to exceed a predetermined minimum, which for the example are three location data instances 92. Cluster 99 is filtered out from further processing because a period of time over which the data instances 92 of cluster 99 were generated, as indicated by respective time stamps of the data instances 92, is less than a predetermined period of time, for example ten minutes. Centroids 104, 105, 106, 107 are determined from the respective average of the location coordinates of the location data instances 92 of the plurality of unfiltered clusters 94, 95, 96, 97.

For each unfiltered cluster 94, 95, 96, 97, distance from the respective centroid 104, 105, 106, 107 to predetermined locations defined by address coordinates 170 and 174, respectively corresponding to a particular retail store 70 and a department store 74, is determined. In response to the distance 6 between the centroid 106 of the cluster 96 and the address coordinate 174 being less than a predetermined distance, for example 50 meters, the cluster 96 is correlated with the department store 74. To initiate the correlation, it is further required that a majority of the time stamps of the data instances 92 in the cluster 96 correspond to a predetermined time range of 10:00 am to 10:00 pm, which is when the department store 74 is open for business. In response to the distance 7 between the centroid 107 of the cluster 97 and the address coordinate 170 being less than a predetermined distance, for example 50 meters, the cluster 97 is correlated with the particular retail store 70 corresponding to the address coordinate 170.

A first base location is defined from data instances 92 of the cluster 94 in response to the time stamps of the data instances 92 of the cluster 94 corresponding to a predetermined time range on particular days of the week for a predetermined number of days. The predetermined time range can be defined for example as between 7:00 pm and 8:00 am on Monday, Tuesday, Wednesday, Thursday and Friday and any hour of the day on Saturday or Sunday. The predetermined number of days can be for example 6 consecutive days, or for example 8 days within a two week period. The first base location is defined as the centroid 104 determined from the average of the location coordinates of the location data instances 92 of the cluster 94. Alternatively, the first base location can be defined as an address coordinate 168 within a predetermined distance 4 from the centroid 104, for example 25 meters, which address coordinate 168 corresponds to a home 68. This first base location may correspond for example to the home of the mobile device user 2.

A second base location is defined from data instances 92 of the cluster 95 in response to the time stamps of the data instances 92 of the cluster 95 corresponding to a predetermined time range for a predetermined number of days. The predetermined time range can be defined for example as between 9:00 am and 5:00 pm on Monday, Tuesday, Wednesday, Thursday and Friday. The predetermined number of days can be for example 6 consecutive weekdays, Monday through Friday, or for example 9 days within a two week period. The second base location is defined as the centroid 105 determined from the average of the location coordinates of the location data instances 92 of the cluster 95. Alternatively, the second base location can be defined as an address coordinate 169 within a predetermined distance 5 from the centroid 105, for example 25 meters, which address coordinate 169 corresponds to a commercial office 69. This second base location may correspond for example to the work place of the mobile device user 2. Alternatively, the first or second base locations can be defined by establishing the presence of the mobile device 12 at a particular location based on data instances of a particular cluster corresponding to a particular time range on particular days of the week for a particular period of days or weeks, wherein the particular time range is not a predetermined time range, and/or the particular days are not predetermined days of the week.

The cluster 94 and cluster 95 corresponding to the first and second base locations are eliminated from consideration in determining the distances from respective cluster centroids to predetermined locations such as retail stores, department stores, theatres or other venues to be associated with location-related data such as advertisements. Data instances in the clusters 94 and 95 are further eliminated from consideration in establishing new clusters. As location data instances are generated via the mobile device 12 and location data instances older than a predetermined length of time expire, the first and second base locations may cease to be regarded as base locations, and new base locations may be established.

In the non-limiting example implementation of the invention illustrated via the streetscape 60, location-related data including a plurality of advertisements provided by an advertiser are correlated with the address coordinate 174 of the department store 74 pursuant to the instructions of the advertiser, which plurality of advertisements pertain to products sold at the department store 74 and include different advertisements to be delivered to users having different estimated personal incomes. The first base location corresponding to the centroid 104 is correlated with demographic data corresponding to an estimated personal income of residents' within the neighborhood of the first base location, which demographic data may be collected from a public source or private source. One or more of the plurality of advertisements corresponding to the estimated personal income associated with the first base location are transmitted to the user 2 via the mobile device 12 in response to correlating the cluster 96 to the address coordinate 174. The one or more advertisements can be transmitted when the user 2 is located at the department store 74 immediately after generation of a sufficient number of data instances to correlate a cluster with the address coordinate 174. Alternatively, the advertisement can be transmitted at a later time, for example after the user 2 has left the department store 74. The advertisement can alternatively be delivered to the user 2 via another client or system other than the mobile device 12. Advertisements can further be delivered to the user 2 of the mobile device 12 based on the user's one or more determined base locations or demographic information such as income information associated with the base locations, regardless of the user's travels outside of the base locations or predetermined locations such as retail stores correlated with clusters established via the mobile device 12.

As indicated above, predetermined locations are preferably correlated with venues such as retail stores, restaurants, event locations, or places of commerce. The coordination system 30 is preferably configured to correlate each of a plurality of predetermined locations with one or more categories, and more specifically, correlate the venue or venues correlated with the predetermined locations with the one or more categories. Preferably, the coordination system 30 maintains a plurality of predefined categories, which categories are correlated with a predetermined location based on input from advertisers, consumers or other knowledgeable entities, and which input can be obtained via query or survey of such knowledgeable entities or suitable data repository. Categories preferably include descriptive terms associated with a venue such as fun, inexpensive, and fast. The coordination system 30 is configured for a particular cluster generated via a user's mobile device to determine the distance from a location coordinate corresponding to the data instances of the cluster, such as a centroid of the cluster, to each of the plurality of predetermined locations. Alternatively, one or more distances can be determined from any suitable mobile device location coordinate or plurality of coordinates to the plurality of predetermined locations, without regard to the aforementioned clustering process. The predetermined distance can be any distance suitable for a particular application, for example 100 ft, ¼ mile, 1 mile, 2 miles or greater distance. The coordination system 30 correlates the mobile device user with the one or more categories of those of the plurality of predetermined locations for which the determined distance is less than a predetermined distance.

Figure 4:
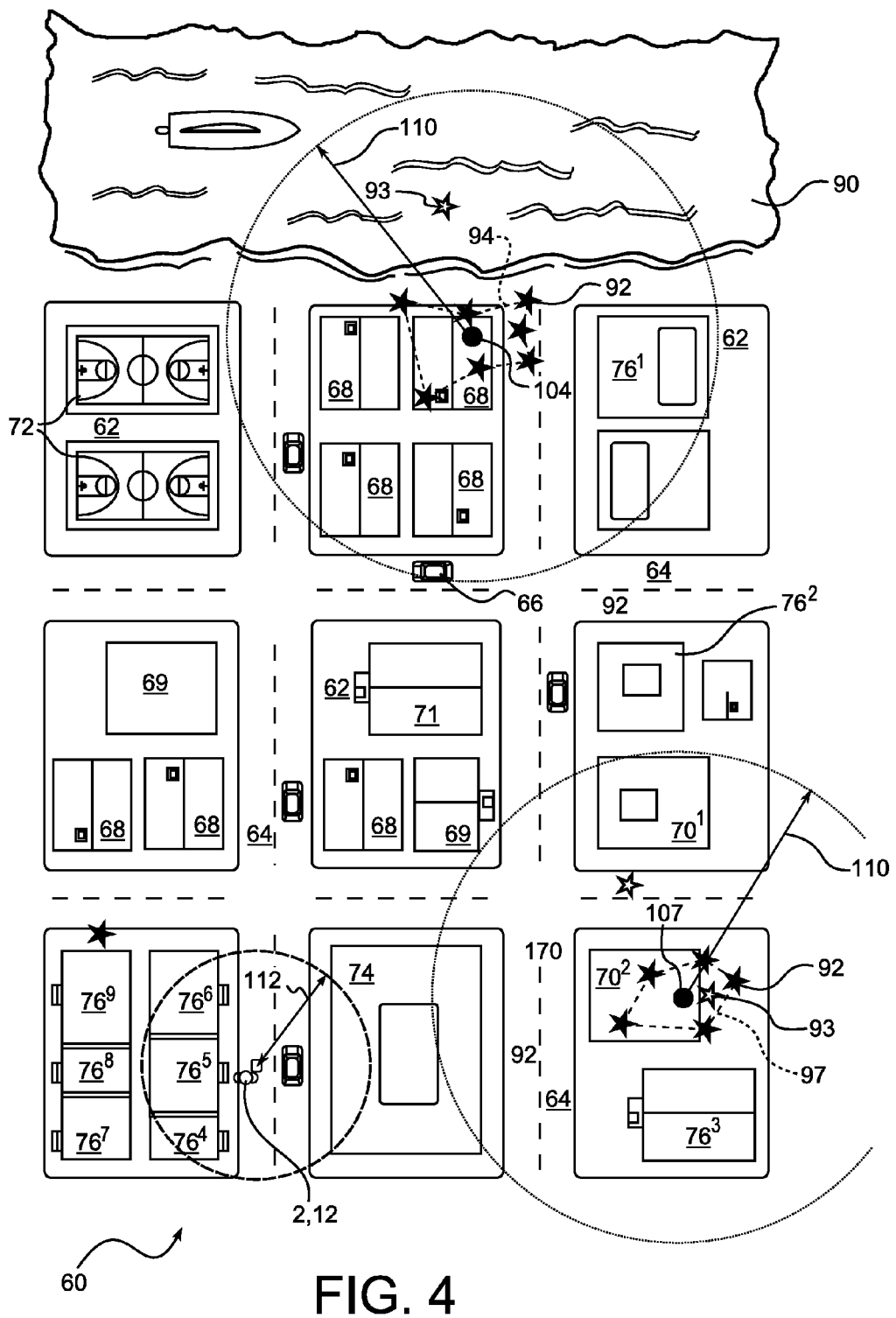

Referring to FIG. 4, the example city streetscape 60 illustrates another non-limiting example implementation of a method according to a preferred embodiment of the invention. Location-related data such as advertisements are correlated with venues at predetermined locations within the streetscape 60. Clusters 94, 97 including data instances 92 generated via the mobile device 12 are used in determining which of the predetermined locations within the streetscape 60 are to be associated with the user 2. Categories associated with venues at the predetermined locations within a predetermined radial distance 110 of the centroid 104, 107 of each cluster 94, 97 are used in determining a vector for the user 2, which vector includes frequency values associated with the categories as the vector components. Alternatively, venues at predetermined locations within a predetermined distance of one or more individual data instances 92 or other mobile device location coordinates of any suitable number can be used in determining the vector for the user 2, without regard to the aforementioned clustering process. The predetermined radial distance 110 can be any distance suitable for a particular application, for example 100 ft, ¼ mile, 1 mile, 2 miles or greater distance. While in the example streetscape 60 two clusters 94, 97 provide the origins for the two radial distances 110, alternatively, any suitable number of locations can be used to provide origins for any number radial distances defining any suitable number of areas around predetermined locations. Within the streetscape 60, the following venues are at predetermined locations within areas defined by the radial distances 110: retail stores including Mary's Consignment $70^1$ and European Clothing Boutique $70^2$, Hi-Fashion Department Store 74, and restaurants including Bill's Burgers $76^1$ and Ron's Gelati $76^3$.

Table 1 below lists categories in columns and venues in rows for predetermined locations within the areas defined by the radial distances 110, wherein an "X" indicates that a particular category is associated with a particular venue at a predetermined location. The categories include descriptive terms fun, inexpensive, fast, ice-cream, Chinese culture, French culture, Mexican culture. While seven categories are listed, any suitable number of categories can alternatively be provided, for example categories can number in the hundreds or thousands, and need not include the seven example categories listed above. Moreover, any suitable number of clusters associated with a particular mobile device can alternatively be analyzed. The number of indications for each category are summed to determine the frequency values for the user 2, which as shown by Table 1 are fun: 3, inexpensive: 2, fast: 1, ice-cream: 2, Chinese culture: 0, French culture: 1, and Mexican culture: 0. Alternatively, the user frequency values can be determined based on the category indications using other suitable computation or algorithm. Alternatively, for efficiency and conservation of computational resources, only a predetermined number of categories with the highest frequency values can be retained, such as the ten categories with the highest frequency values or the three categories with the highest frequency values, which in the example are fun (3), inexpensive (2), and ice-cream (2).

TABLE 1

| | Venue name | Fun | Inexpensive | Fast | Ice-cream | Chinese Culture | French Culture | Mexican Culture |
|---|---|---|---|---|---|---|---|---|
| $70^1$ | Mary's Consignment | | X | | | | | |
| $70^2$ | European Clothing Boutique | | | | | | X | |
| 74 | Hi-Fashion Department Store | X | | | | | | |
| $76^1$ | Bill's Burgers | X | X | X | X | | | |
| $76^3$ | Ron's Gelati | X | | | X | | | |
| | User Frequency Values | 3 | 2 | 1 | 2 | 0 | 1 | 0 |

Table 2 below lists categories in columns and venues in rows for all predetermined locations within the streetscape 60, which for the purpose of this illustrative example comprises the only environment through which the user 2 traverses. A popularity value is determined for each category based on the number of venues to which the particular category is associated. Alternatively, any size region with any suitable number of venues can be used in computing popularity values for categories. The category indications are preferably summed as shown in Table 2 to determine the popularity values for the categories, which in this example are fun: 8, inexpensive: 7, fast: 5, ice-cream: 4, Chinese culture: 2, French culture: 2, and Mexican culture: 1. Alternatively, the popularity values can be determined based on the category indications using other suitable computation or algorithm.

within the defined proximity of the current position of the mobile device 12 and correspond to location-related data including advertisements received from advertisers or other entities. Accordingly, Joe's Ice Cream $76^4$, Sam's Chinese Food $76^5$, and Pierre's French Food $76^6$ are selected as the basis to generate vectors "v" with vector components corresponding to the categories indicated for the respective venues. To generate the vector v for a particular venue, vector components are respectively assigned the popularity values corresponding to the categories which are indicated for the particular venue, whereas for categories which are not indicated

TABLE 2

| Venue name | Fun | Inexpensive | Fast | Ice-cream | Chinese Culture | French Culture | Mexican Culture |
|---|---|---|---|---|---|---|---|
| $70^1$ Mary's Consignment | | X | | | | | |
| $70^2$ European Clothing Boutique | | | | | | X | |
| 71 Culture Theatre | X | | | | | | |
| 72 Playground | X | X | | | | | |
| 74 Hi-Fashion Department Store | X | | | | | | |
| $76^1$ Bill's Burgers | X | X | X | X | | | |
| $76^2$ Jose's Tacos | X | X | X | | | | X |
| $76^3$ Ron's Gelati | X | | | X | | | |
| $76^4$ Joe's Ice-cream | X | X | | X | | | |
| $76^5$ Sam's Chinese Restaurant | | X | X | | X | | |
| $76^6$ Pierre's French Food | X | X | | | | X | |
| $76^7$ Mandarin Buffet | | | | | X | | |
| $76^8$ Quick Convenience Store | | | X | X | | | |
| $76^9$ Bob's Gourmet Delicatessen | | | X | | | | |
| Popularity Values | 8 | 7 | 5 | 4 | 2 | 2 | 1 |

A current position of the mobile device 12 is determined, and a predetermined radial distance 112 representing a predetermined proximity from the current position of the mobile device 12 defines a circular area. For each of the predetermined locations correlated with location-related data and within the defined proximity of the current position of the mobile device 12, a composite value is computed for each category based on the predetermined location's popularity value for the category and the user's frequency value for the category, and a total composite value is determined for the predetermined location based on each composite value of each category associated with the predetermined location. The total composite value is preferably a dot product of a first vector defined by the user frequency values in each category and a second vector defined by the popularity values of indicated categories of the predetermined locations within the defined proximity.

In the example, the seven categories, fun, inexpensive, fast, ice-cream, Chinese culture, French culture, and Mexican culture, enable a vector including seven components. Referring to Table 1, the user 2 corresponds to a vector "u" defined by the determined frequency values for the user 2, which vector u equals (3, 2, 1, 2, 0, 1, 0). The venues Joe's Ice Cream $76^4$, Sam's Chinese Food $76^5$, and Pierre's French Food $76^6$ are for the particular venue, the corresponding vector components are assigned a zero value. Accordingly, based on the popularity values of Table 2, the vectors v are defined as follows for the venues within the defined proximity of the mobile device 12:

Joe's Ice Cream: $v_{Joe's}$=(8, 7, 0, 4, 0, 0, 0)
Sam's Chinese Food: $v_{Sam's}$=(0, 7, 5, 0, 2, 0, 0)
Pierre's French Food: $v_{Pierre's}$=(8, 7, 0, 0, 0, 2, 0)

The total composite value "TC" associated with each venue is preferably the dot product of the vector u and the vector v for the venues within the defined proximity of the current position of the mobile device 12 and is as follows:

Joe's Ice Cream: $TC_{Joe's}$=u·$v_{Joe's}$=3·8+2·7+1·0+2·4+0·0+1·0+0·0=46
Sam's Chinese Food: $TC_{Sam's}$=u·$v_{Sam's}$=3·0+2·7+1·5+2·0+0·2+1·0+0·0=19
Pierre's French Food: $TC_{Pierre's}$=u·$v_{Pierre's}$=3·8+2·7+1·0+2·0+0·0+1·2+0·0=40

The total composite values are compared. The total composite value $TC_{Joe's}$ corresponding to Joe's Ice Cream $76^4$ is greater than both of the total composite values $TC_{Sam's}$ and $TC_{Pierre's}$ respectively corresponding to Sam's Chinese Food and Pierre's French Food. An advertisement or other promotional material corresponding to Joe's Ice Cream $76^4$ is transmitted to the user 2 via the mobile device 12, preferably at or near its current position as shown in FIG. 4, in response to the total composite value $TC_{Joe's}$ being the greatest among all venues within the area defined by the radial distance 112.

Figure 5:
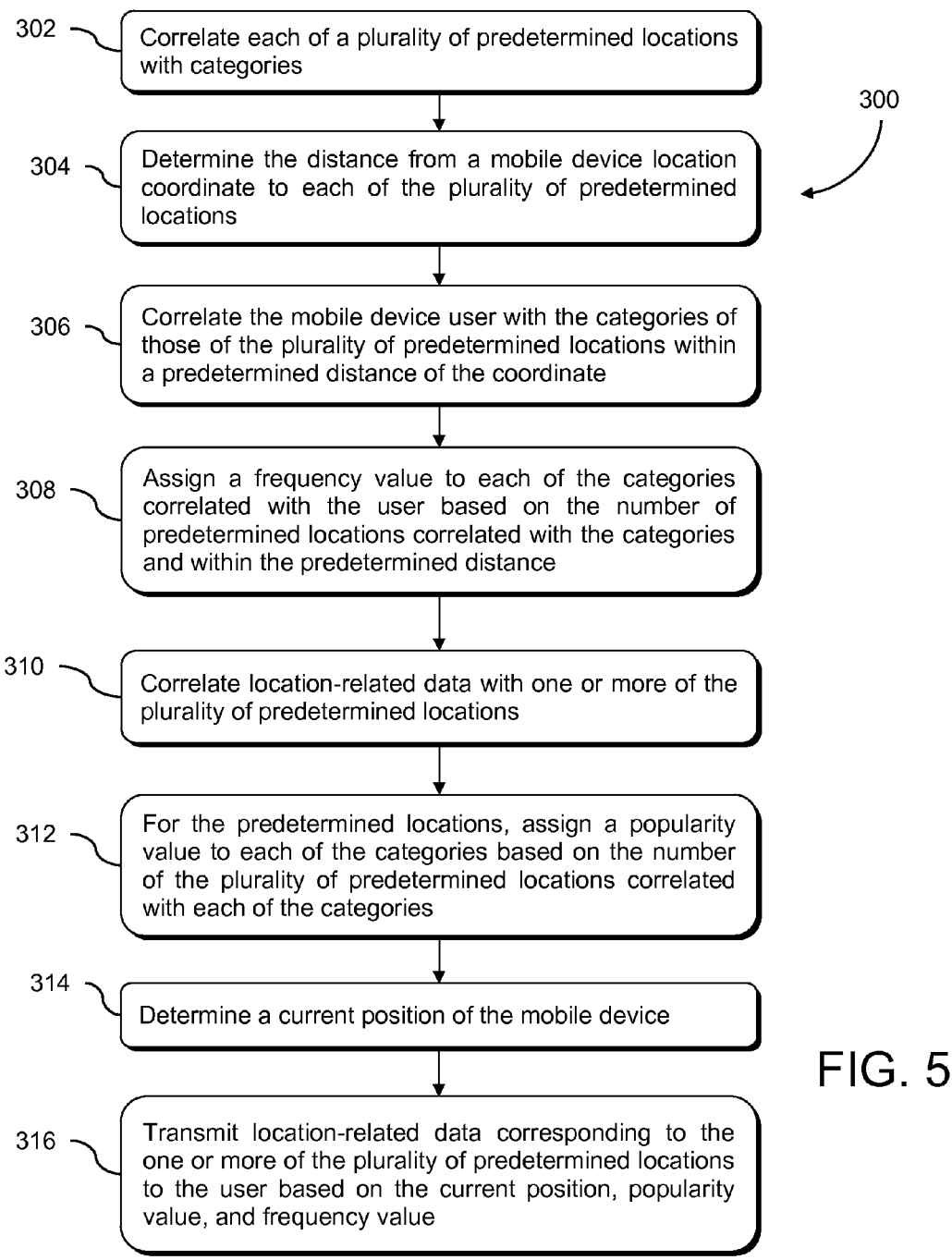
FIG. 5 is a flow chart showing another computer-implemented method for processing mobile device location data according to a preferred embodiment of the invention.

Referring to FIG. 5, a method 300 according to a preferred embodiment of the invention is shown. The method 300 includes correlating each of a plurality of predetermined locations with one or more categories (step 302) and determining for one or more data instances of a mobile device the distance from a location coordinate corresponding to the one or more data instances to each of the plurality of predetermined locations (step 304). A user of the mobile device is correlated with the one or more categories of those of the plurality of predetermined locations for which the distance from the location coordinate is less than a predetermined distance (step 306). A frequency value is assigned to each of the one or more categories correlated with the user based on the number of those of the plurality of predetermined locations correlated with the one or more categories for which the distance from the location coordinate is less than the predetermined distance (step 308). Location-related data, for example an advertisement, is correlated with one or more of the plurality of predetermined locations (step 310). For the one or more of the plurality of predetermined locations, a popularity value is assigned to each of the one or more categories based on the number of the plurality of predetermined locations correlated with each of the one or more categories (step 312). A current position of the mobile device is determined (step 314). Location-related data corresponding to the one or more of the plurality of predetermined locations is transmitted to the user in response to the current position of the mobile device being within a predetermined proximity of the one or more of the plurality of predetermined locations and based on the popularity value and the frequency value (step 316). Preferably for those of the plurality of predetermined locations within the predetermined proximity from the current position of the mobile device and correlated with location-related data, for each category correlated with a predetermined location, a composite value is computed based on the predetermined location's popularity value for the category and the user's frequency value for the category, and a total composite value is computed for the predetermined location based on the composite value for each category. The total composite values of the plurality of predetermined locations within the predetermined proximity from the current position of the mobile device are preferably compared, and location-related data correlated with the plurality of predetermined locations within the predetermined proximity from the current position of the mobile device is transmitted to the user based on the comparison of the total composite values of the plurality of predetermined locations within the predetermined proximity from the current position of the mobile device.

Figure 6:
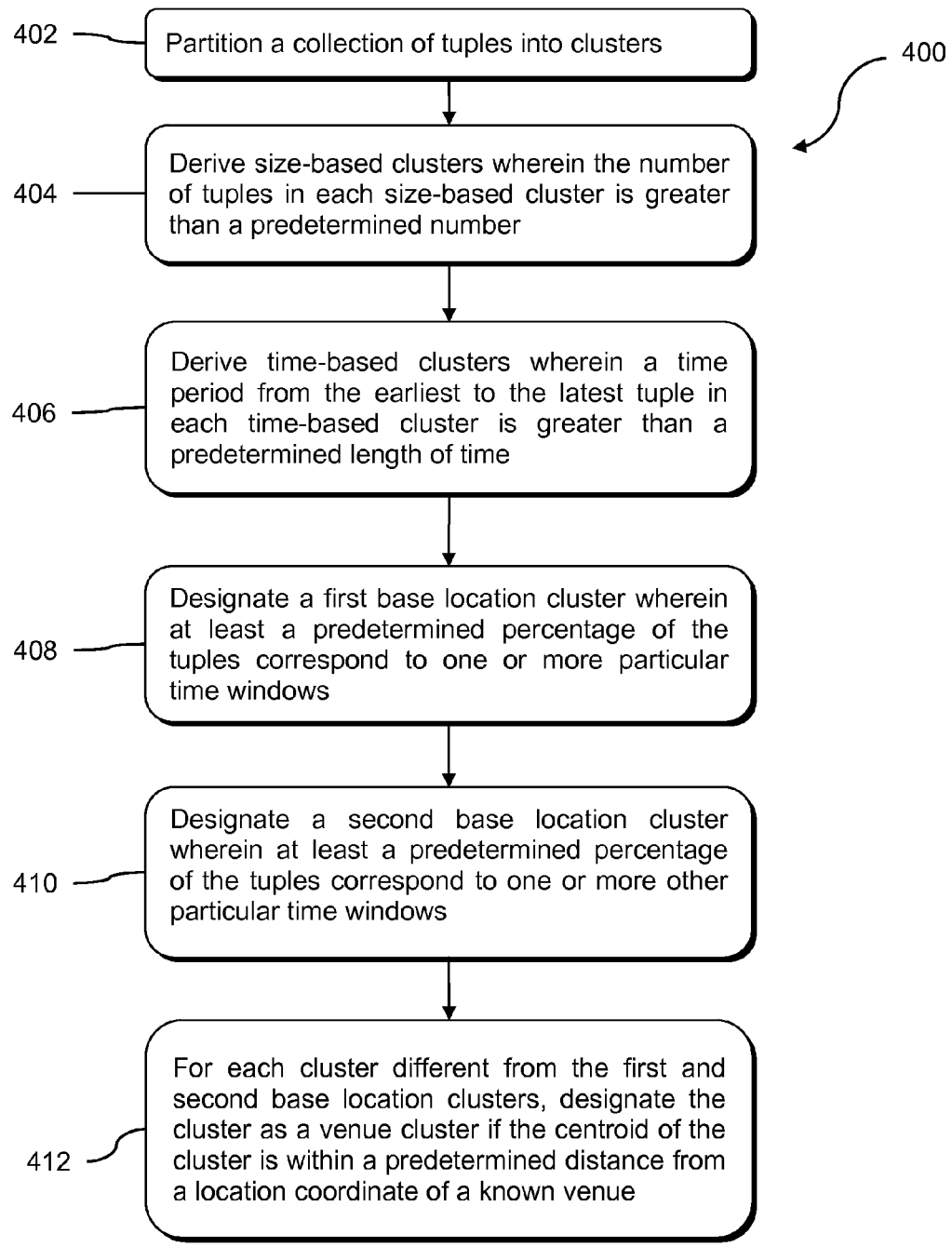
FIG. 6 is a flow chart showing another computer-implemented method for processing mobile device location data according to a preferred embodiment of the invention.

Referring to FIG. 6, a method 400 according to a preferred embodiment of the invention is shown. The method 400 includes partitioning a collection of tuples including time stamps and location coordinates into a plurality of clusters wherein the distances between location coordinates of each of the tuples in each of the plurality of clusters are less than a predetermined distance (step 402), wherein the tuples are generated via a particular mobile device associated with a particular user. Alternatively, the tuples are partitioned wherein the distances between location coordinates of at least a majority of the tuples in each of the plurality of clusters are less than a predetermined distance. Partitioning is preferably performed using a K-means variant clustering algorithm. Size-based clusters are derived, wherein the number of tuples in each size-based cluster is greater than a predetermined number (step 404). Time-based clusters are derived, wherein a time period from the earliest tuple to the latest tuple in each time-based cluster as indicated by the respective time stamps is greater than a predetermined length of time (step 406). Time-based clusters are preferably derived from those of the plurality of clusters not derived as size-based clusters. A first base location cluster is designated as the largest size-base location cluster, including the most tuples, wherein at least a predetermined percentage of the tuples correspond to one or more particular time windows (step 408), for example between 7:00 pm and 8:00 am on Monday through Friday and all day on Saturday and Sunday. A second base location cluster is designated as the largest size-base cluster wherein at least a predetermined percentage of the tuples correspond to one or more other particular time windows, for example between 9:00 am and 5:00 pm on Monday through Friday and between 12:00 pm and 4:00 pm on Saturday and Sunday (step 410). Alternatively, the first and second base location clusters may be designated as time-based or size-based clusters wherein at least a predetermined percentage of the tuples correspond to one or more particular time windows. The first base location cluster can correspond for example to a home location where the particular mobile device user lives, and the second base location can correspond for example to a work location where the particular mobile device user works. The method 400 further includes for each size-based and time-based cluster different from the first and second base location clusters, determining a centroid of the cluster and designating the cluster as a venue cluster if the centroid of the cluster is within a predetermined distance from the location coordinate of a known venue (step 412). The first and second base location clusters are preferably not considered in correlating clusters with known venues. A known venue can include a physical commercial establishment such as a retail store, event location such as a park or stadium, or other suitable destination. Preferably, location-related data related to the known venue is transmitted to the user in response to designating a cluster as a venue cluster. Such location-related data can include advertisements related to the venue.

While the preferred embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented method for processing mobile device location data, the method comprising:

partitioning a collection of tuples including time stamps and location coordinates, generated via a particular mobile device associated with a user, into a plurality of clusters wherein distances between location coordinates of the tuples in each of the plurality of clusters are less than a predetermined distance;

deriving from the plurality of clusters size-based clusters, wherein the number of tuples in each size-based cluster is greater than a predetermined number;

deriving from the plurality of clusters time-based clusters, wherein a time period from a substantially earliest tuple to a substantially latest tuple in each of the time-based clusters, as indicated by respective time stamps, is greater than a predetermined length of time; and designating at least one base location cluster from at least one of the size-based clusters and the time-base clusters wherein at least a predetermined percentage of the tuples correspond to at least one particular time window.

2. The method of claim 1, further comprising designating the at least one base location cluster as the largest size-based cluster wherein at least a predetermined percentage of the tuples correspond to the at least one particular time window.

3. The method of claim 1, further comprising for each particular one of the size-based clusters and the time-based clusters different from the at least one base location cluster, determining a centroid of the particular cluster and designating the particular cluster as a venue cluster if the centroid of the particular cluster is within a predetermined distance from a location coordinate of a known venue.

4. The method of claim 3, further comprising transmitting location-related data corresponding to the known venue to the user.

5. The method of claim 1, further comprising deriving the time-based clusters from those of the plurality of clusters not derived as size-based clusters.

6. The method of claim 1, further comprising partitioning the collection of tuples wherein the distances between location coordinates of each of the tuples in each of the plurality of clusters are less than a predetermined distance.

7. The method of claim 1, further comprising partitioning the collection of tuples wherein the distances between location coordinates of a majority of the tuples in each of the plurality of clusters are less than a predetermined distance.

\* \* \* \* \*